April 7, 1953 R. R. CROOKSTON 2,634,100
KELLY DRIVE BUSHING STABBER
Filed Dec. 16, 1950
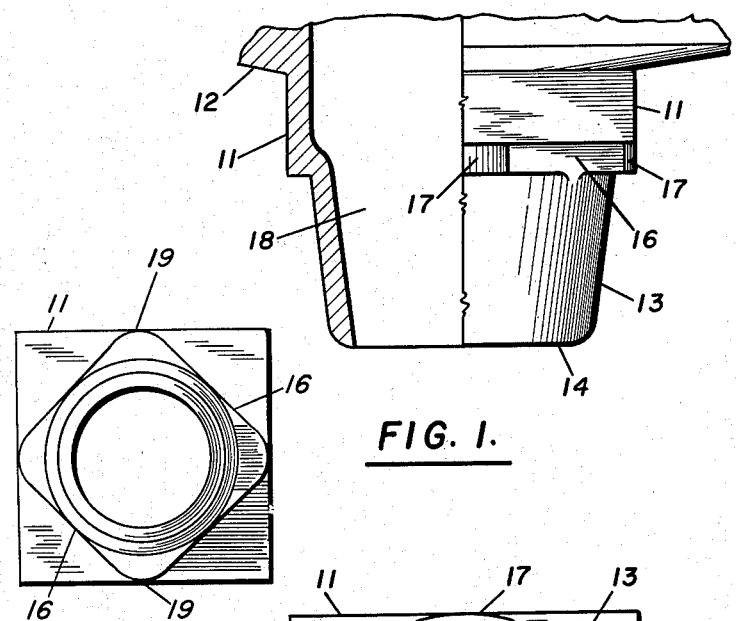
FIG. 1.
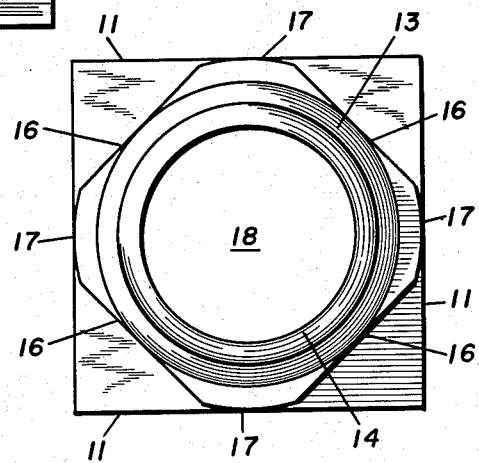
FIG. 3
FIG. 2.
INVENTOR.
Robert R. Crookston,
BY
AGENT.

Patented Apr. 7, 1953

2,634,100

UNITED STATES PATENT OFFICE 2,634,100

KELLY DRIVE BUSHING STABBER

Robert R. Crookston, Houston, Tex., assignor, by mesne assignments, to Standard Oil Development Company, Elizabeth, N. J., a corporation of Delaware Application December 16, 1950, Serial No. 201,211

5 Claims. (Cl. 255—23)

The present invention relates to well drilling apparatus and particularly to a stabber for a kelly drive bushing. In its more specific aspects, the invention is directed to a stabber which will center the drive bushing in the master bushing.

The present invention is directed to a stabber for a kelly drive bushing which comprises a male member affixed to the bushing defining a square-sided shoulder at a point intermediate the bushing and a free end of the male member. The squared sides of the shoulder are connected by a rounded surface which is a segment of a closed curve. The male member defines with the bushing an internal passageway to receive the kelly.

The squared sides of the shoulder of the apparatus of the present invention are connected by a rounded surface which is a segment of a closed curve such as an ellipse or a circle which has a diameter greater than the distance across the flats of the square. The male member has an external diameter at the shoulder equal to the distance across the flats of the square to allow the stabber to enter the square under any circumstances or to enter the master bushing under any circumstances that permits the kelly itself to enter the bushing. The present invention is particularly designed to be used with a master bushing for rotary tables, such as set out in the API specifications for rotary drilling equipment, as described in API Standards 7-B, Tenth Edition, August, 1947, supersedes Ninth Edition dated July, 1944, issued by American Petroleum Institute, Division of Production, Dallas, Texas. In Section X, page 20, of the aforementioned Standards a description of the rotary table and the master bushing, in which the present invention may be employed, is given.

The invention will be described in more detail by reference to the drawing in which Fig. 1 is an elevational view, in partial section, of an embodiment of the invention;

Fig. 2 is a view looking upward on the device of Fig. 1; and

Fig. 3 is a view taken in the same direction as is Fig. 2 showing another embodiment of the present invention.

Referring now to the drawing and first to the embodiment of Figs. 1 and 2, numeral 11 indicates generally a kelly drive bushing connected to a body portion 12 which is affixed to a male member 13 tapering downwardly to a free end 14. The male member 13 defines a shoulder 15 intermediate the bushing 11 and the free end 14. The shoulder 15 has squared sides 16 which are connected by rounded surfaces 17 which are segments of a closed curve. The bushing 11 and the member 13 define an internal passageway 18 to receive the kelly.

The rounded surfaces 17 which connect the squared side 16 are segments of a closed curve. In the embodiment of Figs. 1 and 2 the closed curve is a circle with a diameter greater than the distance across the flats of the square defined by the sides 16. For example, when the closed curve is a circle the diameter thereof for a bushing stabber in accordance with the present invention may be 13½ inches whereas the distance across the flats of the square may be 12 inches. Thus the 13½ inch male square 11 which is the kelly drive bushing can be readily guided into the master bushing. Thus with 12 inches across the flats of the square with the corners rounded to a 13½ inch diameter with as little as one-quarter revolution the 12-inch square will fall into the 13½ inch opening of the master bushing and the rounded corners center the device. The square opening of the master bushing has a distance across the flats thereof equal to the diameter of the rounded corners when the closed curve is a segment of a circle.

Another embodiment of the present invention is shown in Fig. 3. In this embodiment parts corresponding to like parts of the embodiment of Figs. 1 and 2 are designated by identical reference numbers. It will be seen that the embodiment of Fig. 3 differs from that of the embodiment of Figs. 1 and 2 in having the squared sides 16 of shoulder 15 connected by rounded surfaces 19 which are segments of an ellipse. As can be seen, the maximum distance separating diametrically opposite closed curves is substantially equal to the distance between flats of the squared bushing portion 11.

Thus in accordance with the present invention, a simple device is provided which allows the centering of the kelly drive bushing with little relative motion. The invention is based on incorporating in the apparatus of the present invention a mathematically shaped shoulder that will enter the square under any circumstances which permit the kelly itself to pass through the bottom opening of the cone section of the master bushing.

It will be clear that the device of the present invention is simple and inexpensive to manufacture since the novelty and inventive features thereof depend on the combination of a male member affixed to the bushing which defines a square-sided shoulder, the sides of which are connected by a rounded surface which is a segment of a closed curve.

It will be seen from the foregoing description taken with the drawing that the male member may be tapered downwardly and may be of a conical shape. It will also be clear that the closed curve may be a segment of a circle or a segment of an ellipse and yet allow the advantages of the invention to be obtained. Without the present invention, stabbing is difficult with the stabbers used in conjunction with the aforementioned standard API equipment since, if the kelly drive suspension is off-center from the rotary table, the tapered section when off-center tends to ride the upper edge of the squared section and to hang on that edge by its own one-quarter inch projection.

The nature and objects of the present invention having been completely described and illustrated, what I wish to claim as new and useful and to secure by Letters Patent is:

1. A kelly drive bushing which comprises an upper squared section, a lower downwardly tapering section, and a centering device intermediate the upper and lower sections, said centering device comprising a cam surface having major and minor effective diameters, the effective minor diameter of said cam surface being coincident with the diameter of the upper end of the lower tapered section, the effective major diameter of said cam surface being substantially equal to the distance between flats on said upper squared section.

2. A kelly drive bushing which comprises an upper squared section, a lower downwardly tapering section and a centering device intermediate the upper and lower sections, said centering device comprising a cam surface having major and minor effective diameters consisting of diametrically arranged flat sided shoulders with the distance across the flats of said sides being the minor diameter of said cam surface and coincident with the diameter of the upper end of the lower tapered section and said flat sides being connected by a rounded surface which is a segment of a closed curve, the maximum diametrical distance separating said closed curves being the effective major diameter of said cam surface and substantially equal to the distance between flats on said upper squared section.

3. A kelly drive bushing which comprises an upper squared section, a lower downwardly tapering section and a centering device intermediate the upper and lower sections, said centering device comprising a cam surface having major and minor effective diameters consisting of a flat sided shoulder the flat sides of which if extended would form a square with the distance across the flats of said sides being the minor diameter of said cam surface, said flat sides being connected by rounded surfaces which are the segment of a closed curve, the maximum diametrical distance separating said rounded surfaces being the effective major diameter of said cam surface and substantially equal to the distance between flats on said upper squared section.

4. A stabber in accordance with claim 3 in which the closed curve is a circle.

5. A stabber in accordance with claim 3 in which the closed curve is an ellipse.

ROBERT R. CROOKSTON.

REFERENCES CITED

The following references are of record in the file of this patent:

UNITED STATES PATENTS

| Number | Name | Date |
|---|---|---|
| 1,656,456 | Trout | Jan. 17, 1928 |